US 7,876,059 B2

(12) United States Patent
Chaffai et al.

(10) Patent No.: US 7,876,059 B2
(45) Date of Patent: Jan. 25, 2011

(54) SYSTEM AND METHOD FOR CONTROLLING A MATRIX OF LIGHT EMITTING DIODES AND LIGHT PROVIDED THEREWITH

(75) Inventors: Rachid Chaffai, Saint-Hubert (CA); Louis Duguay, Hudson (CA)

(73) Assignee: Elumen Lighting Networks, Inc., Montreal (CA)

( * ) Notice: Subject to any disclaimer, the term of this patent is extended or adjusted under 35 U.S.C. 154(b) by 623 days.

(21) Appl. No.: 11/792,536

(22) PCT Filed: Dec. 2, 2005

(86) PCT No.: PCT/CA2005/001833

§ 371 (c)(1),
(2), (4) Date: Mar. 12, 2008

(87) PCT Pub. No.: WO2006/060900

PCT Pub. Date: Jun. 15, 2006

(65) Prior Publication Data

US 2010/0013402 A1     Jan. 21, 2010

Related U.S. Application Data

(60) Provisional application No. 60/633,443, filed on Dec. 7, 2004, provisional application No. 60/633,444, filed on Dec. 7, 2004.

(51) Int. Cl.
*H05B 37/00* (2006.01)
(52) U.S. Cl. ............... 315/307; 315/247; 315/308; 315/309
(58) Field of Classification Search ............... 315/307, 315/308, 309, 246, 247, 291, 219
See application file for complete search history.

(56) References Cited

U.S. PATENT DOCUMENTS 5,177,408 A     1/1993   Marques (Continued)

FOREIGN PATENT DOCUMENTS

DE     101 19 491 A1     7/2002

OTHER PUBLICATIONS

European Search Report issued in counterpart application PCT/CA2005/001833, dated Feb. 25, 2009.

(Continued)

*Primary Examiner*—David Hung Vu
(74) *Attorney, Agent, or Firm*—Venable LLP; Robert Kinberg

(57) ABSTRACT

A system and method for controlling a matrix of light emitting diodes (LED) connected to an input line comprises a power converter for connecting to the matrix of LEDs and to the input line therebetween and for receiving from the input line an input current and an input voltage characterized by a shape and a frequency and for providing a direct current (D.C.) output for powering up the LEDs, yielding an operating current through the LEDs. The power converter includes a first current sensor for sensing the input current and a second current sensor for sensing the operating current. The system further comprises a controller for connecting to both the input line and to the power converter. The controller includes a voltage sensor for sensing the input voltage and a pre-regulator i) for receiving the operating current, the input current and the input voltage, ii) for biasing the operating current towards a target current value, and iii) for regulating the power converter to cause the input current to follow the shape and frequency of the input voltage, yielding a unity power factor and minimizing the input current harmonic distortion. The present method and system allows maximizing the energy savings, controlling current flowing in the diodes so as to obtain the maximum flux of light with the minimum energy and also allows meeting all safety, EMI, reliability and robustness requirements.

24 Claims, 17 Drawing Sheets

U.S. PATENT DOCUMENTS

| | | |
|---|---|---|
| 5,610,451 A | 3/1997 | Symonds |
| 5,803,579 A | 9/1998 | Turnbull et al. |
| 6,057,651 A | 5/2000 | Usami |
| 6,091,614 A | 7/2000 | Malenfant |
| 6,232,937 B1 | 5/2001 | Jacobsen et al. |
| 6,400,102 B1 * | 6/2002 | Ghanem ..................... 315/291 |
| 6,459,919 B1 | 10/2002 | Lys et al. |
| 6,570,505 B1 | 5/2003 | Malenfant |
| 6,658,622 B1 | 12/2003 | Aiken et al. |
| 7,276,861 B1 * | 10/2007 | Shteynberg et al. ......... 315/291 |
| 2002/0179816 A1 | 12/2002 | Haines et al. |

OTHER PUBLICATIONS

Patent Cooperation Treaty PCT International Search Report issued for International Application No. PCT/CA2005/001833, and Written Opinion of the International Searching Authority, dated Apr. 4, 2006.

* cited by examiner

SYSTEM AND METHOD FOR CONTROLLING A MATRIX OF LIGHT EMITTING DIODES AND LIGHT PROVIDED THEREWITH

FIELD OF THE INVENTION

The present invention relates to streetlights or the like provided with a matrix of light emitting diodes. More specifically, the present invention is concerned with a system and method for controlling such matrix.

BACKGROUND OF THE INVENTION

The conventional streetlight, provided with metal halide, mercury or sodium filled bulb suffers from few disadvantages. A first disadvantage is the relatively high energy consumption. Another one is the relatively short life of the bulb. Indeed, after a few years of operation the bulb fails and needs to be replaced.

Matrices of light emitting diodes (LEDs) have been introduced in streetlights as a replacement solution to the conventional bulbs. However, the power controlling of current LED matrix in streetlight has been found inefficient, resulting in lost of energy and of light flux for a given input power consumption.

More efficient system and method for controlling a matrix of light emitting diodes are thus desirable.

OBJECTS OF THE INVENTION

An object of the present invention is therefore to provide an improved system and method for controlling a matrix of light emitting diodes.

Another object of the present invention is to provide improved streetlights or improved lights provided with a light emitting diode matrix.

SUMMARY OF THE INVENTION

According to the present invention, there is provided a method and system for controlling a matrix of light emitting diodes in a streetlight or the like. The present method and system allows maximizing the energy savings. Moreover, it allows controlling current flowing in the diodes so as to obtain the maximum flux of light with the minimum energy and also allows meeting all safety, EMI, reliability and robustness requirements.

For example, a streetlight provided with a matrix of light emitting diodes and a system for controlling such a matrix according to the present invention provides significant energy savings and a useful life that is more then 10 times higher compared to the conventional high pressure sodium or mercury lamps. One major advantage is that the light efficiency is much higher. Therefore a streetlight according to the present invention generates a large economy of energy in the order of 80% compared to streetlights provided with bulb lamps. A second advantage is the longer life of the diodes matrix. A high pressure sodium bulb has only a few years of useful life while the light emitting diode has more then 20 years of useful life. This allows significantly reducing the maintenance cost, reducing the scrap and increasing the road safety.

More specifically, in accordance with the present invention, there is provided a system for controlling a matrix of light emitting diodes (LED) connected to an input line, the system comprising:

a power converter for connecting to the matrix of LEDs and to the input line there between and for receiving from the input line an input current and an input voltage characterized by a shape and a frequency and for providing a direct current (D.C.) output for powering up the LEDs, yielding an operating current through the LEDs; the power converter including a first current sensor for sensing the input current and a second current sensor for sensing the operating current;

a controller for connecting to both the input line and to the power converter; the controller including a voltage sensor for sensing the input voltage and a pre-regulator i) for receiving the operating current, the input current and the input voltage, ii) for biasing the operating current towards a target current, and iii) for regulating the power converter to cause the input current to follow the shape and frequency of the input voltage, yielding a unity power factor and minimizing the input current harmonic distortion.

According to a second aspect of the present invention, there is provided a system for controlling a matrix of light emitting diodes (LEDs) connected to an input line, the system comprising:

converter means for connecting to the matrix of LEDs and to the input line there between and for receiving from the input line an input current and an input voltage characterized by a shape and a frequency and for providing a direct current (D.C.) output for powering up the LEDs, yielding an operating current through the LEDs;

first sensing means for sensing the input current;
second sensing means for sensing the operating current;
third sensing means for sensing the input voltage; and
controller means for connecting to both the input line and to the converter means i) for receiving the operating current, the input current and the input voltage, ii) for biasing the operating current towards a target current, and iii) for regulating the converter means to cause the input current to follow the shape and frequency of the input voltage, yielding a unity power factor and minimizing the input current harmonic distortion.

According to a third aspect of the present invention, there is provided a method for controlling a matrix of light emitting diodes (LED) connected to an input line, the method comprising:

measuring from the input line an input current;
measuring from the input line an input voltage characterized by a shape and a frequency;
providing a LED target current;
converting the input line voltage into a direct current (D.C.) output voltage for powering up the LEDs, yielding an operating current through the LEDs, by forcing the input current to follow the shape and frequency of the input voltage, yielding a unity power factor and minimizing the input current harmonic distortion;
measuring an operating current through the LEDs; and
biasing the operating current towards the LED target current.

Other objects, advantages and features of the present invention will become more apparent upon reading the following non restrictive description of illustrated embodiments thereof, given by way of example only with reference to the accompanying drawings.

BRIEF DESCRIPTION OF THE DRAWINGS

In the appended drawings:

FIGS. 6A, 6B, 6C and 6D are graphs illustrating respectively the steady state wave forms at nominal input utility line, the start up wave forms at low utility line, the load transient wave forms and the utility line drop out wave forms of the streetlight unit from FIG. 1; channel 1 representing the input voltage measurement, channel 2 representing the output voltage measurement, channel 3 representing the input current measurement and channel 4 representing the output current measurement;

DESCRIPTION OF THE PREFERRED EMBODIMENT

Figure 1:
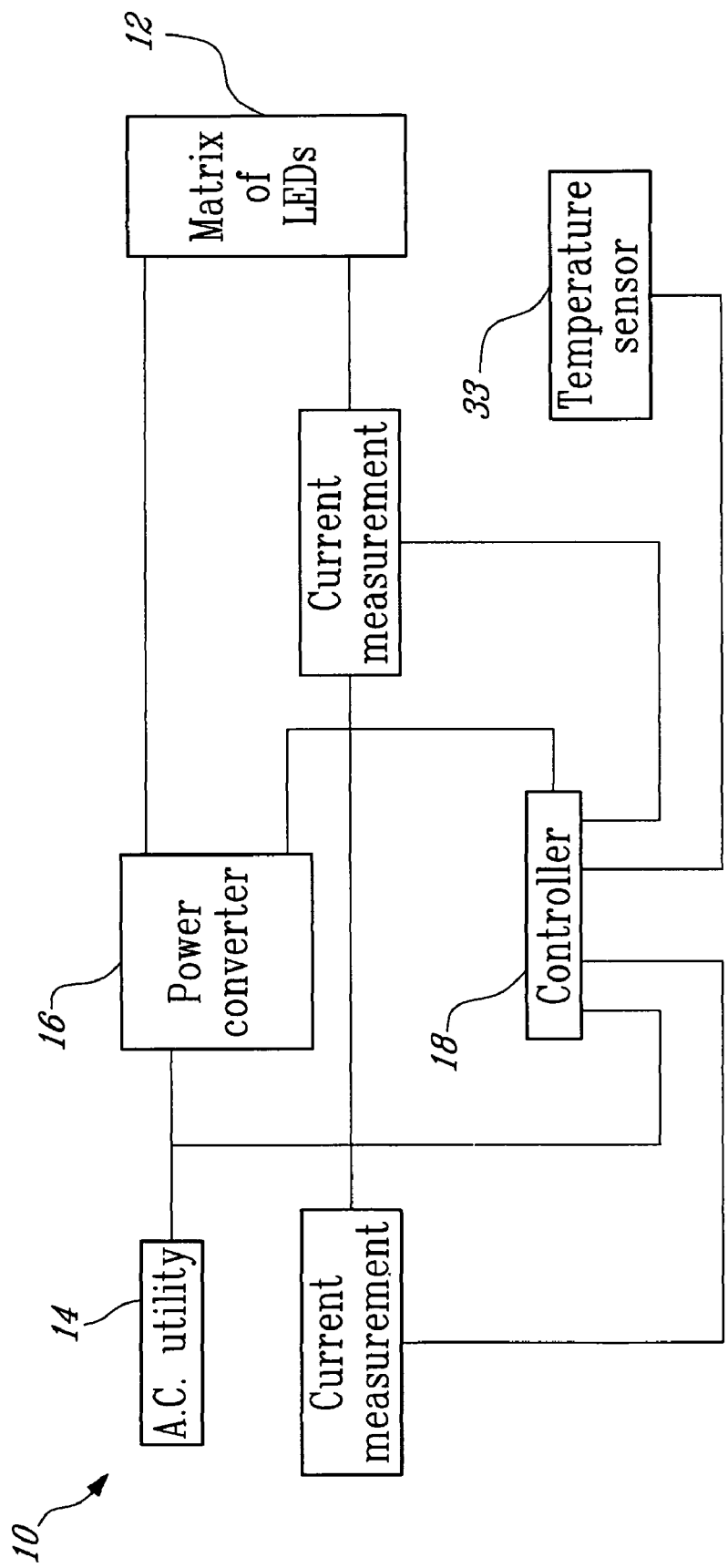
FIG. 1 is a schematic view of a streetlight unit according to a first illustrative embodiment of the present invention.

A streetlight unit 10 according to a first illustrative embodiment of the present invention will now be described with reference to FIG. 1 of the appended drawings.

The streetlight unit 10 comprises a matrix of light emitting diodes (LEDs) 12 connected to the A.C. (alternating current) utility network 14 via a power converter 16, and a controller 18 for the power converter 16.

The matrix of LEDs 12 includes a combination of diodes connected in series and in parallel (not shown). This connection arrangement of diodes provides a significant improvement to the reliability and life of the streetlight 10 compare with a conventional streetlight provided with a matrix of LEDs. Indeed, the parallel connection of the diodes (for example 2 to 20) assures that even if one diode is failing short or open, the remaining matrix is not affected by the failure; the streetlight 10 can still operate, with only a small degradation of luminescence. The streetlight 10 can however operate beyond its stated and rated life if the LEDs would all have been connected in series.

The series connections (for example 2 to 250) allow driving the LEDs 12 with a high DC voltage and therefore simplifying the power converter 16 and improving its efficiency.

The streetlight unit 10 will now be described in more detail with reference to FIGS. 2 to 6.

Figure 2:
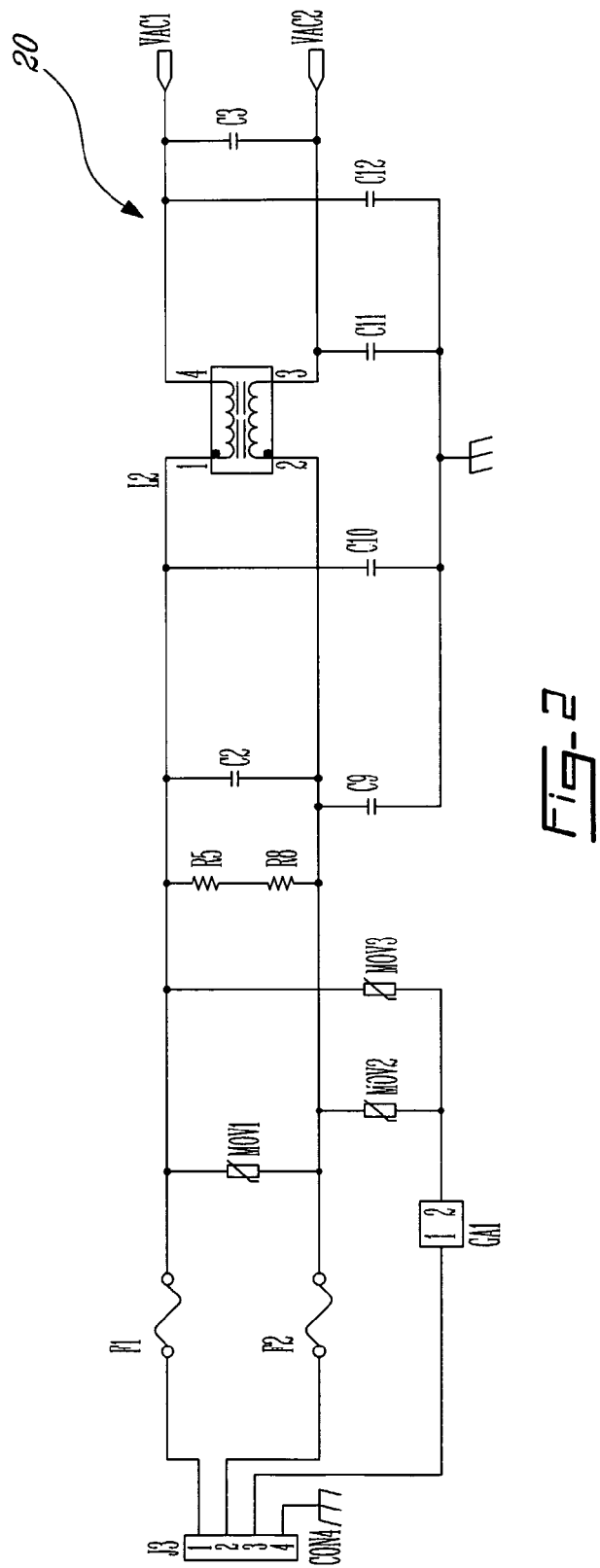
FIG. 2 is a circuit diagram illustrating the electromagnetic interference (EMI) filter of the streetlight unit from FIG. 1.

The streetlight unit 10 further includes an electromagnetic interference (EMI) filter 20, which is illustrated in FIG. 2, connected to the A.C. utility 14 at the input of the power converter 16. The EMI filter 20 together with the power converter 16 and controller 18 define a system for controlling a matrix of LEDs.

The filter 20 includes two differential mode capacitors C2 and C3, five common mode capacitors C9, C10, C11, C12 and C13 and a common mode inductor L2, the leakage inductor of this magnetic element L2 further acting as a differential mode filter. It is to be noted that the capacitor C4 and C5 of the power converter 18 are also used for the EMI concerns. The EMI filter 20, in association with the proper layout, such as the one described in FIGS. 1-4, renders the unit 10 conformed to the EMI American and European specifications (FCC part 15, EN55022/CISPR 22 and CSA C108). Since such specifications are believed to be well known in the art, and for concision purposes, they will not be described herein in more detail.

The unit 10 is also designed to be conformed to the well-known IEEE C62.41 specifications allowing it to handle most type of utility disturbances without any damage, including lightning strikes (typically 6000V, 3000 A, 50 microseconds). For that purposes, the EMI filter 20 includes three transient voltage suppressors MOV1, MOV2 and MOV3 (see FIG. 2) which are coupled to a diode D1 of the power converter 16. The diode D1 helps transferring some of the lightning energy to the output capacitor formed by C1 and C6 in series (see FIG. 3). This allows increasing the MOV's life time and decreasing the over voltage stress on all the power converter semiconductors including its input diode bridge D4, D5, D8 and D9. Indeed, decreasing the maximum voltage constraint on the power semiconductor contribute to increasing their life time and also the overall efficiency of the converter 16.

Returning to FIG. 2, two input line fuses F1 and F2 are used to prevent damage inside the unit 10. A gas arrester GA1 is also provided to minimize the leakage current of the transient voltage suppressors MOV2 and MOV3, thereby increasing their life time and permitting to test the line to chassis isolation without damaging the MOVs. Then, for the safety, the converter further has the VDE, CSA and UL certifications.

Finally, the input 22 of the power converter 16 includes a negative temperature coefficient (NTC) resistor to control the inrush current during the start-up. The unit 10 is configured conformably to the specifications IEC-1000-2-3 and EN60555 part 2, regarding the quality of the input current wave form. Since such specifications are believed to be well known in the art, and for concision purposes, they will no be described herein in more detail.

The input 22 of the power converter 16 is connected at the AC utility 14 (VAC1, VAC2). The converter 16 provides a DC output that is used to power up the LEDs 12. The input frequency and input voltage is converted into DC voltage and current to properly drive the LEDs 12 to maximize the luminescence. As will be explained herein below in more detail, measures of both the input voltage and current are sent to the controller 18 to allow for a unity power factor and to minimize the input current harmonic distortion. The controller 18 forces the input current to follow the input voltage, forces also the LEDs current set pointo extract a maximum luminescence and manages all the utility 14 disturbances (Start-Stop, Swell, Sag and Surge). This provides the robustness to withstand the utility transient.

Figure 3:
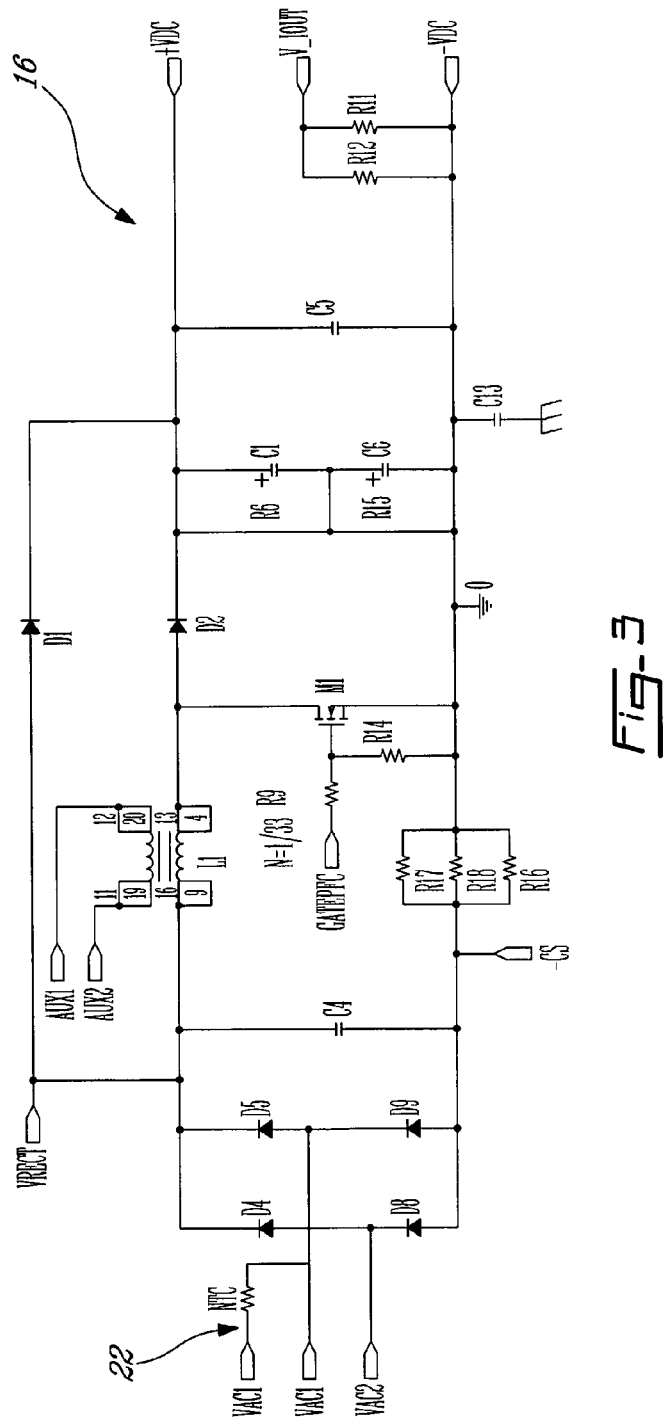
FIG. 3 is a circuit diagram illustrating the power converter of the streetlight unit from FIG. 1.

Turning now to FIG. 3, the power converter 16 will now be described in more detail. As will become more apparent upon reading the following description, the converter 16 is in the form of a boost converter, adapted for a matrix of LEDs including a large number of LEDs, such as 200 or more. In addition to a streetlight, applications for a matrix including such a large number of LEDs includes without limitations lights for a highway, a play-ground, a monument, an indoor parking, pathways, building, and flood and area type lighting fixtures and luminaries.

The power converter 16 includes an input diode bridge formed by diodes D4, D5, D8 and D9, the primary of a transformer L1, an active switch M1 and a boost converter output diode D2. Any transistor technology, such as IGBT (insulated gate bipolar transistor), MOSFET (metal-oxide semiconductor field-effect transistor) or bipolar transistor (BIPOLAR) can be used for the active switch M1.

The switch M1 is modulated at high fixed frequency to force the input current to follow the input voltage. The current for the LEDs is set for maximum luminescence and minimum input power. The input current is sensed by three resistors connected in parallel R16, R17 and R18, while the LEDs operating current is sensed by R11 and R12 in parallel. Both current measurements are sent to the controller 18.

Figure 4:
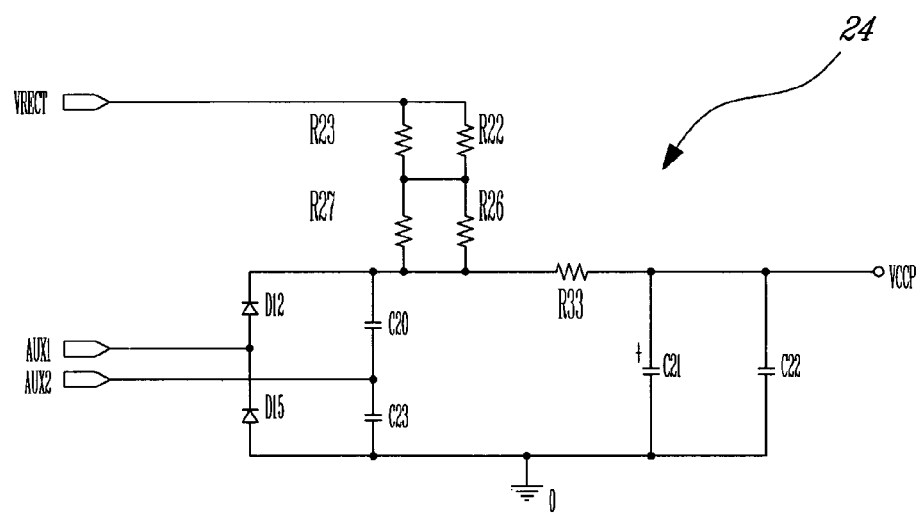
FIG. 4 is a circuit diagram illustrating an auxiliary power supply of the streetlight unit from FIG. 1.

FIG. 4 illustrates a low cost high frequency auxiliary power supply 24 including the L1 secondary winding associated with the network, resistor devices R22, R23, R26, R27 and R33, diodes D12 and D15, capacitors C20, C21, C22 and C23. The power supply 24 is configured so that its output voltage is automatically regulated proportionally to the output voltage of the power converter 16.

The controller 18 of the converter 16 will now be described in more detail with reference to FIGS. 5A-5B.

The controller 18 includes a power factor pre-regulator 26 and an input line voltage sensor 28 in the form of three resistors in series (R38, R39 and R40) connected to the pre-regulator 26 as an input thereof. The controller 18 biased the power converter 16 towards a unity power factor and a low THD (total harmonic distortion). The controller 18 senses via the sensor 28 the input line voltage and regulates the converter 16 to cause the input current to follow the shape and frequency of the input voltage. It is to be noted that the zero and pole for the input current controller are fixed by R24, R31, R34, C15 and C17. This yields a unity power factor (higher then 0.99 at nominal AC line input voltage, higher then 0.97 for all input voltage range "nominal voltage±15%") and also a low THD, which is less then 5% at nominal AC line input voltage.

Figure 5A:
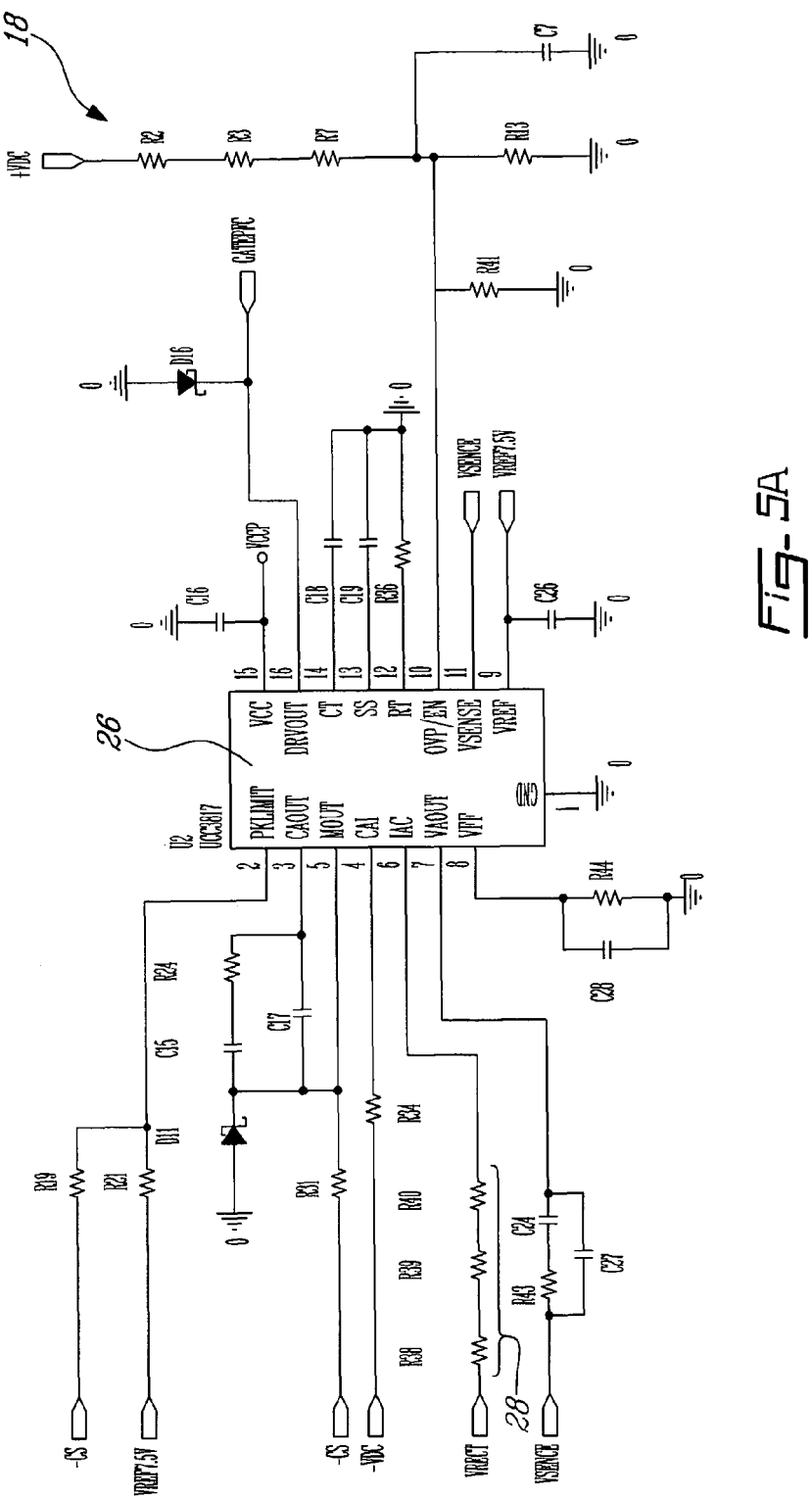
FIGS. 5A-5B are circuit diagrams illustrating the power converter controller of the streetlight unit from FIG. 1.

Even though the illustrative embodiment of FIG. 5A includes a UCC3817 from Texas Instrument as the pre-regulator 26, any power factor pre-regulator can be used to control the input current wave shape and to regulate the input power.

As described hereinabove, the output voltage (+VDC) is in the form of a high voltage DC output. One conventional way to drive the LEDs 12 is to insert a resistor in series with the diodes 12 and then to drive the LEDs 12 by a voltage source. The disadvantage of such method is a variation of current through the LEDs 12 with the input voltage, the component variations and the temperature. This variation of current through the LEDs 12 would cause a variation of luminescence from the diodes 12. The flux of light would then vary with some internal and external parameters. Since the voltage drop of the LEDs 12 varies with the temperature, the resulting current would then vary accordingly. Also the luminescence of the diode decreases with temperature.

Since the LEDs 12 require a specific current to generate the light, the controller 18 according to the present invention is configured to drive the LEDs 12 with a precise current as opposed to a precise voltage.

Figure 5B:
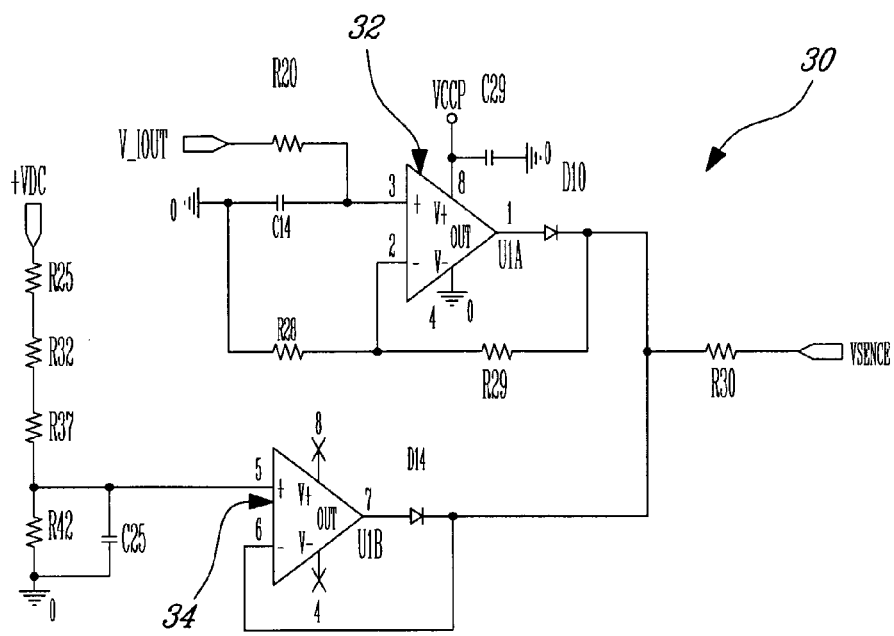

FIG. 5B illustrates a LEDs voltage and current controller 30, part of the power converter controller 18. In a nutshell, the current of the LEDs matrix 12 is monitored as well as the temperature of the diodes. The controller 18 processes this information and controls the converter 16 to assure that the LEDs 12 are driven by a DC current with a maximum of luminescence. This allows optimizing the light output of the LEDs 12 while taking a minimum input power.

The zero and pole for the LEDs voltage and current controller 30 are determined by R30, R43, C24 and C27 from the controller 18.

Turning back briefly to FIG. 3, a measure of the current is performed at R11 and R12 in parallel and transmitted to U1A 32 by V_IOUT. The output voltage of U1A 32 is proportional to the LEDs current [IOUT×(1+R29/R28)]. U1A 32 allows the controller 18 to maintain the current to a very stable nominal target value.

A temperature sensor 33 (see FIG. 1) detects the operating temperature of the LEDs 12 and a modification to the nominal target current is done to assure the optimum luminescence of the LEDs 12 is achieved with different ambient temperature. The temperature sensor 33 may take measures at fixed or variable time intervals. Those intervals may also vary depending on the climate where the light 10 is installed. Of course, more precise temperature measurements may yield both a better luminescence and a better life time of the light 10.

The resistor R28 can be replaced by a digitally controlled variable resistor EEPOT (Electrically Erasable Potentiometers), allowing to selectively increase the LEDs current by increasing the variable resistor.

In addition, the nominal target current may be adjusted with time to cope with the aging of the LED matrix 12. The target values or a predetermined algorithm allowing to obtained such values may be stored in a memory (not shown) coupled with the controller 18. The time adjustment may be based on the number of powering ups of the matrix 10. This feature allows uniform luminescence over time even though the luminescence of the diodes may vary with time.

The controller 18 offers a dual mode of regulation. Indeed, as described hereinabove, the normal regulation is with the LEDs 12 current. But to protect the LEDs 12 from failing and to avoid a high voltage thereon, which can damage them, the controller 18 is configured to switch over a voltage regulation mode. U1B 34 (see FIG. 5B) then regulates the controller 18 to assure a selected voltage is not surpassed and indeed will protect the LEDs 12 if multiple failures occur. U1A 32 sends the information to the controller 18 when the output voltage reaches a pre-determined safety value.

As stated hereinabove, the power converter 16 is rugged under AC line voltage disturbances. Indeed, the controller 18 offers protection in case of high voltage present on the input or high current being drawn from the line 14. In such cases the switch M1 momentarily stops functioning to assure the disturbance is passing through without overstressing any components.

Experimental wave form results obtained using the streetlight unit 10 are shown in FIGS. 6A-6D.

More precisely, FIGS. 6A, 6B, 6C and 6D are graphs illustrating respectively the steady state wave forms at nominal input utility line, the start up wave forms at low utility line, the load transient wave forms and the utility line drop out wave forms of the streetlight unit 10.

In FIGS. 6A-6D, channel 1 represents the input voltage measurement, channel 2 represents the output voltage measurement, channel 3 represents the input current measurement and channel 4 represents the output current measurement.

The experimental values have been obtained using a system for controlling a matrix of LEDs according to the first illustrative embodiment of the present invention similar to the system 10, configured to control a matrix of LEDs of 90 Watts and having an operating range between 176 Vrms and 295 Vrms.

Figure 6A:
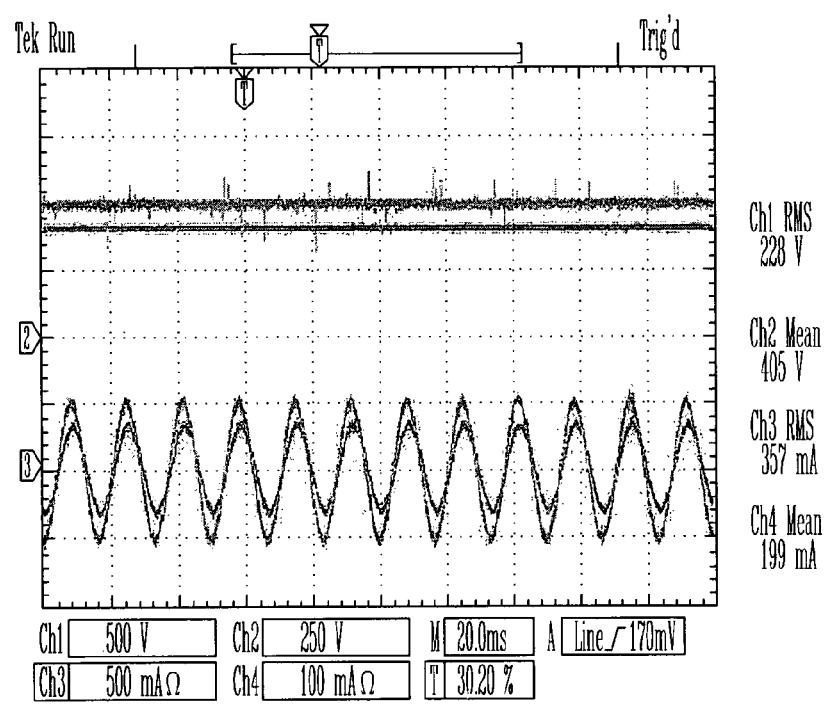
Figure 8B:
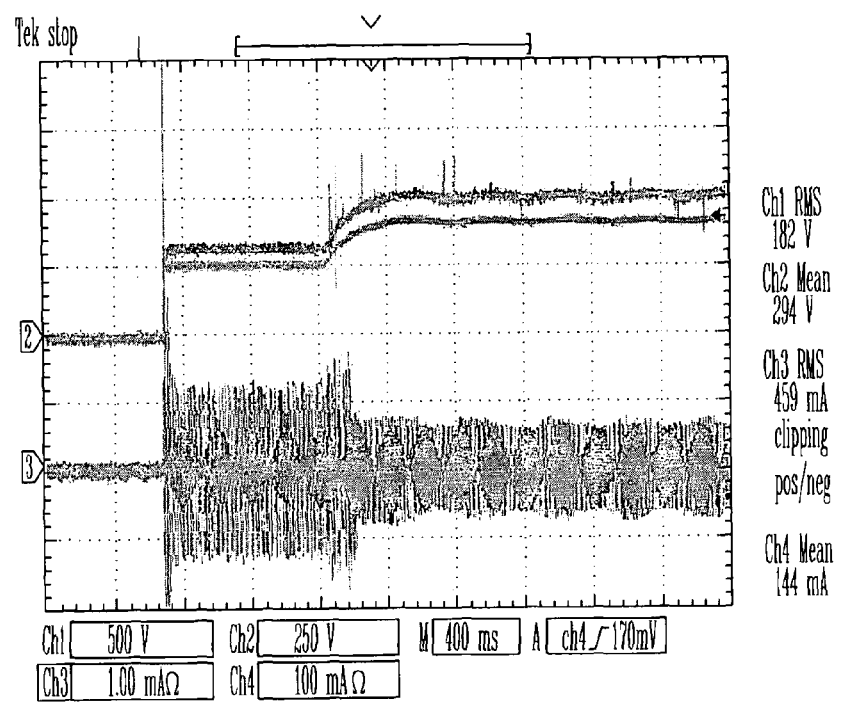
FIG. 8 is a circuit diagram illustrating a power converter part of the system for controlling a matrix of light emitting diodes according to the second illustrative embodiment of the present invention.

FIG. 6A shows that the waveforms of the input current (channel 3) and of the input voltage (channel 1) are identical, yielding a unity power factor and allowing to minimize the harmonic distortion. FIG. 6A also shows that the output current (channel 4) is a well-controlled D.C. current.

FIG. 6B shows a minimum of a bout 10 to 20 minutes are required, in the case of sodium or mercury-based bulb, to achieve a maximum of illumination intensity when an input voltage is applied. Less than two (2) seconds are required to achieve maximum illumination using a controlling system according to the present invention.

Figure 6C:
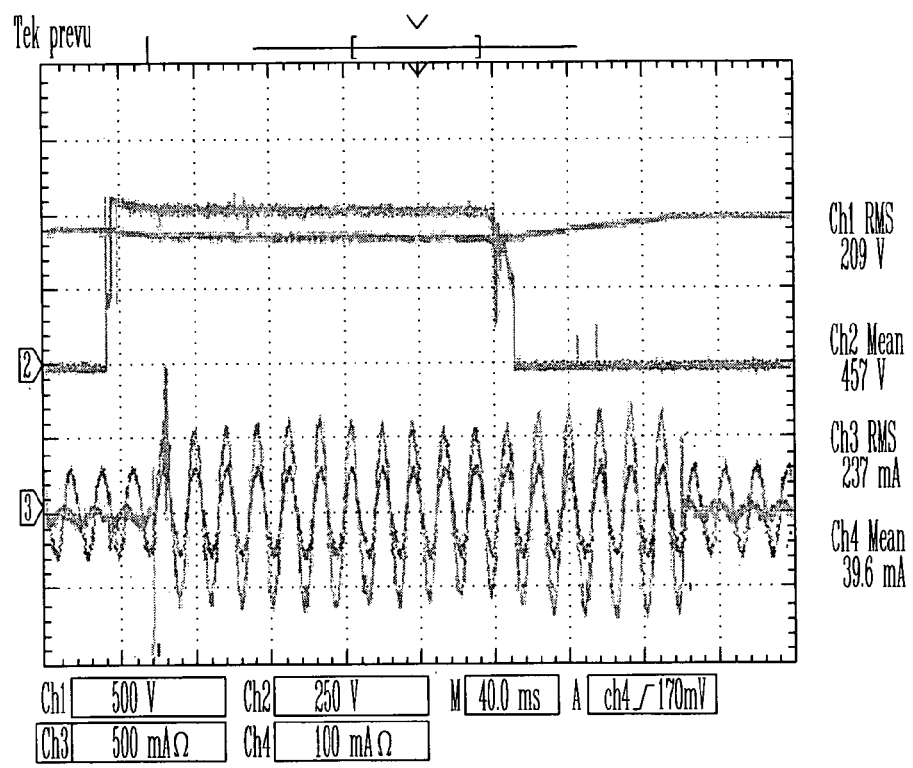
Figure 60:
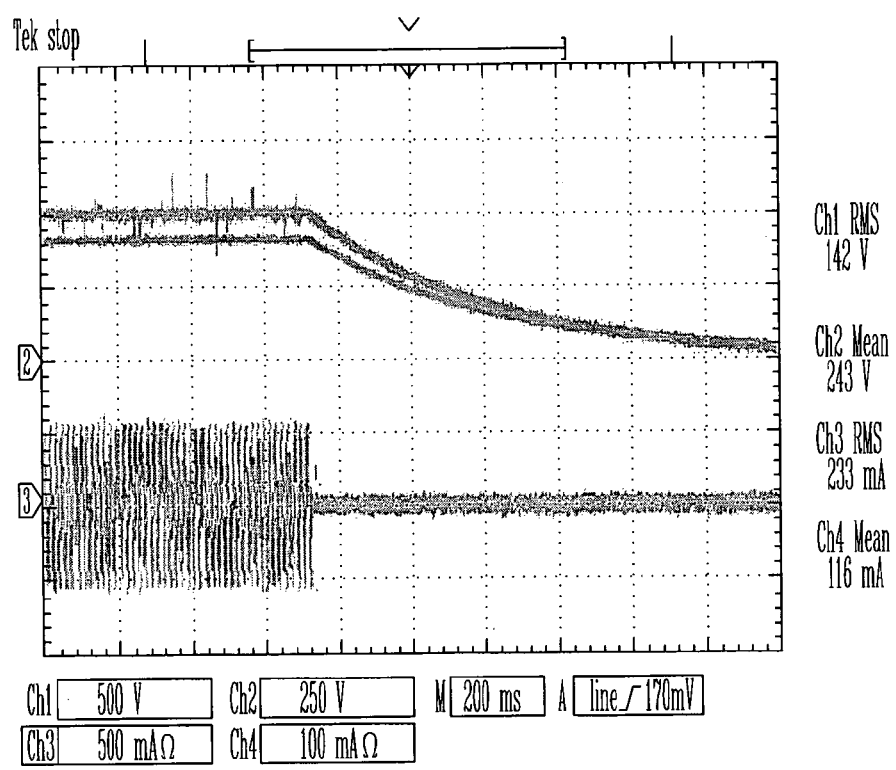
Figure 7:
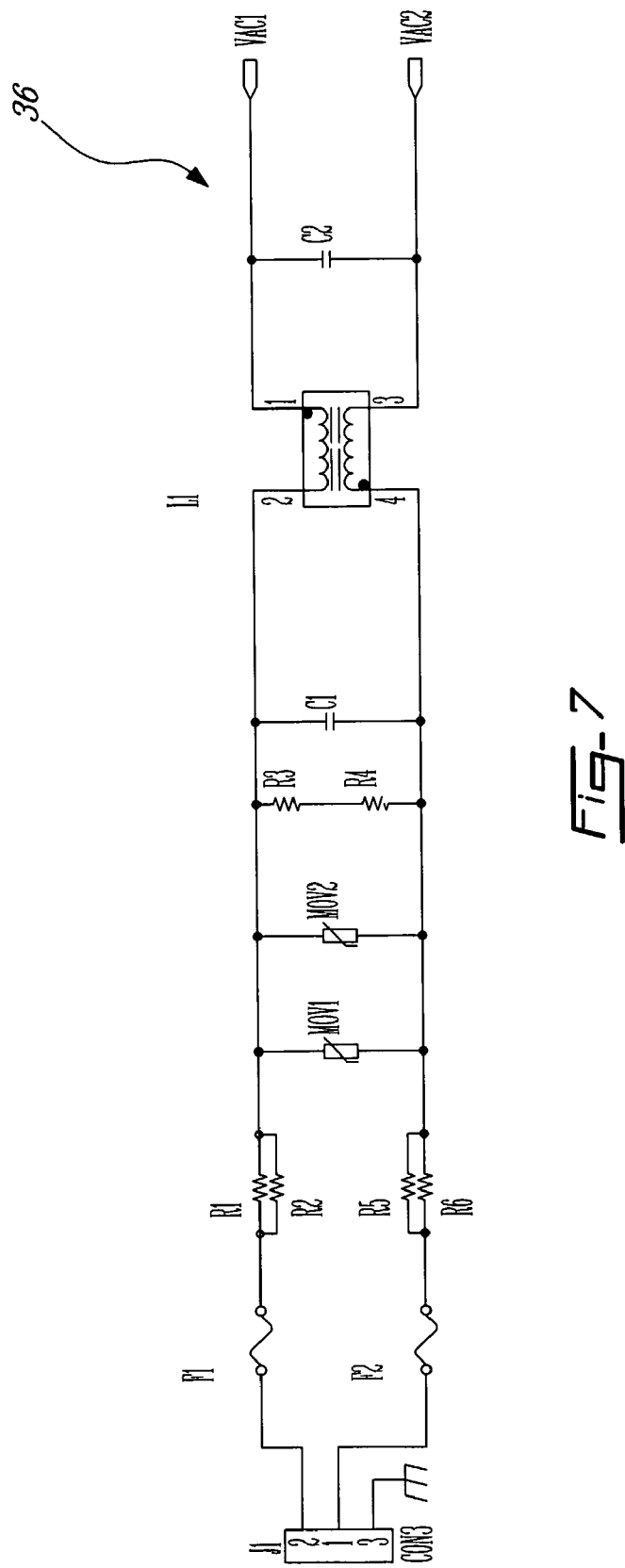
FIG. 7 is a circuit diagram illustrating an electromagnetic interference (EMI) filter part of a system for controlling a matrix of light emitting diodes according to a second illustrative embodiment of the present invention.

FIG. 6C shows that both the input and output currents remain under control even when the matrix of LEDs is connected or disconnected while the converter remains alive.

Finally, FIG. 6D illustrates the controlled extinction of the matrix during a utility power outage A system for controlling a matrix of LEDs according to a second illustrative embodiment of the present invention will now be described with reference to FIGS. 7 to 9B. Since the LEDs matrix controlling system according to this second illustrative embodiment is similar to the one described in reference to the streetlight 10, and for concision purposes, only the differences between the two systems will be described herein in more detail.

The LEDs matrix controlling system according to the second illustrative embodiment shares the same general layout as the unit 10 as described shown in FIG. 1. It includes an EMI filter 36 (see FIG. 7) at the input stage, which, in association with proper layout, allows the unit to be conformed to the EMI American and the European specifications (FCC part 15, EN55022/CISPR 22 and CSA C108, a power converter 38 (see FIG. 8), in the form of a flyback converter, and a controller 40 for the converter (see FIGS. 9A-9B). While the filter 20, power converter 16 and controller 18 are together particularly suitable for controlling a matrix having a large number of LEDs 12, such as 200 or more, the filter 36, power converter 38 and converter 40 are together particularly suitable for controlling a matrix having a number of LEDs lower than 5000. Applications for such a controlling system includes traffic signal lights, train signalization lights, residential lights, industrial building lights, office lights, etc.

The filter 36 includes two differential mode capacitors C1 and C2, and a differential mode inductor L1. The capacitors C10 and C5, which are part of the converter 40 (see FIG. 8) are also used for the EMI concerns. The unit is designed to prevent damage under utility disturbances. More specifically, the filter 36 includes two transient voltage suppressors MOV1, MOV2 coupled to the resistors R1, R2, R5 and R6, which would generate for example less then a quarter watt losses for a matrix including 400 LEDs. These resistors limit lightning current circulating into MOV1 and MOV2. This technique allows decreasing the over voltage stress on all the semiconductors of the power converter 38. Two input line fuse F1 and F2 are used to prevent any catastrophic damage inside the LEDs controlling system. For further safety purposes, the converter can have the VDE, CSA and UL certifications. Since VDE, CSA and UL certifications are believed to be well known in the art, and for concision purposes, they will not be described herein in more detail.

Figure 8:
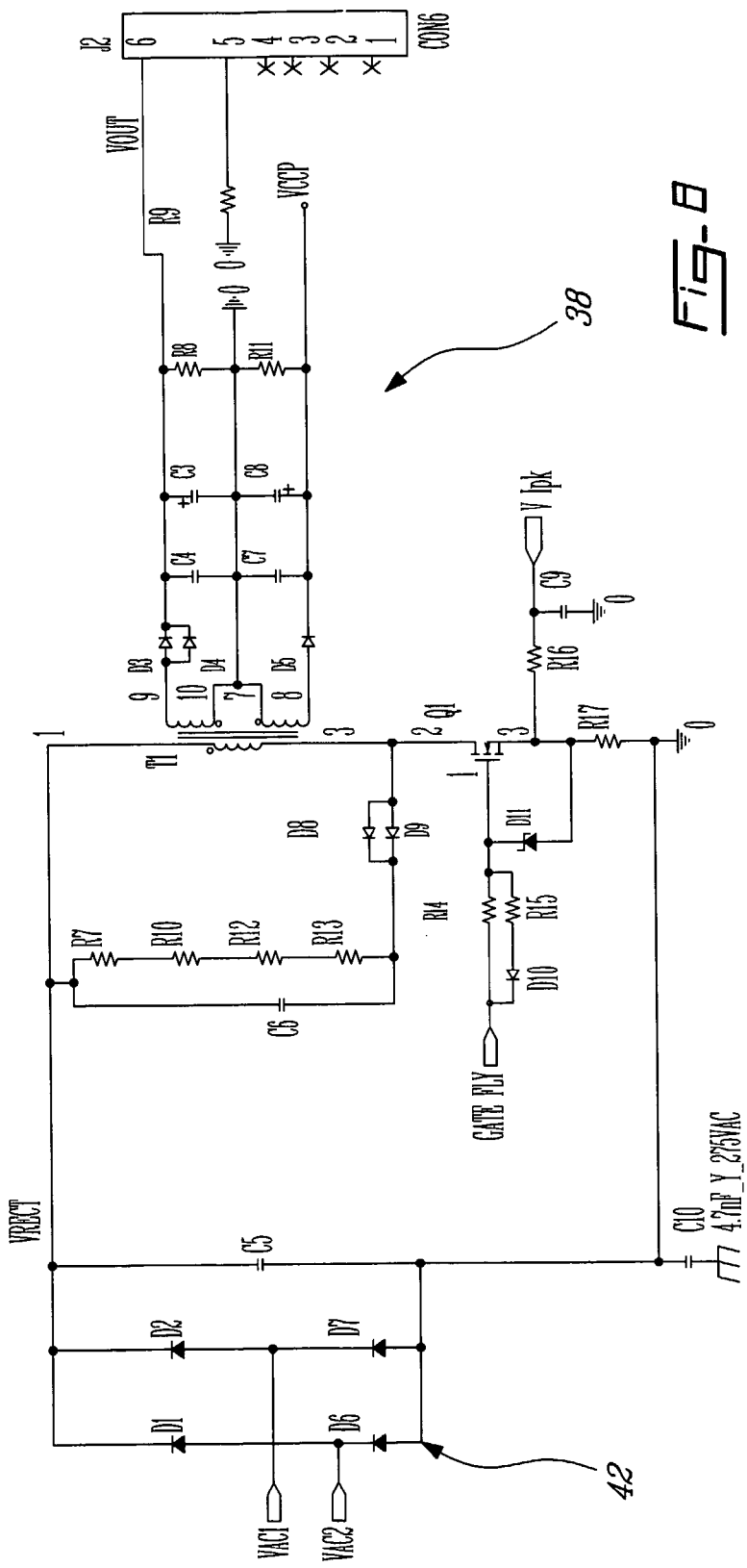

The power converter 38 will now be described in more detail with reference to FIG. 8. The power converter is in the form of a flyback converter having an input diode bridge 42 (D1, D2, D6 and D7), a transformer T1, an active switch Q1 and two output diodes D3 and D4. The active switch Q1 can take many forms, including without limitations IGBT, MOS-FET and BIPOLAR.

The transformer T1 extra secondary winding associated with D5 and C8 represents a low cost high frequency auxiliary power supply. According to this configuration, the output voltage of the auxiliary power supply is automatically regulated proportionally to the output voltage.

The network formed by D8, D9, R7, R10, R12, R14 and C6 helps to clamp the voltage across the switch Q1; the transformer leakage inductor energy being damped by this network.

The switch Q1 is modulated at a high predetermined frequency to force the input current, in association with the input EMI filter 36, to follow the input voltage. The current for the LEDs is set at the optimal point for maximum luminescence and minimum input power.

Figure 9A:
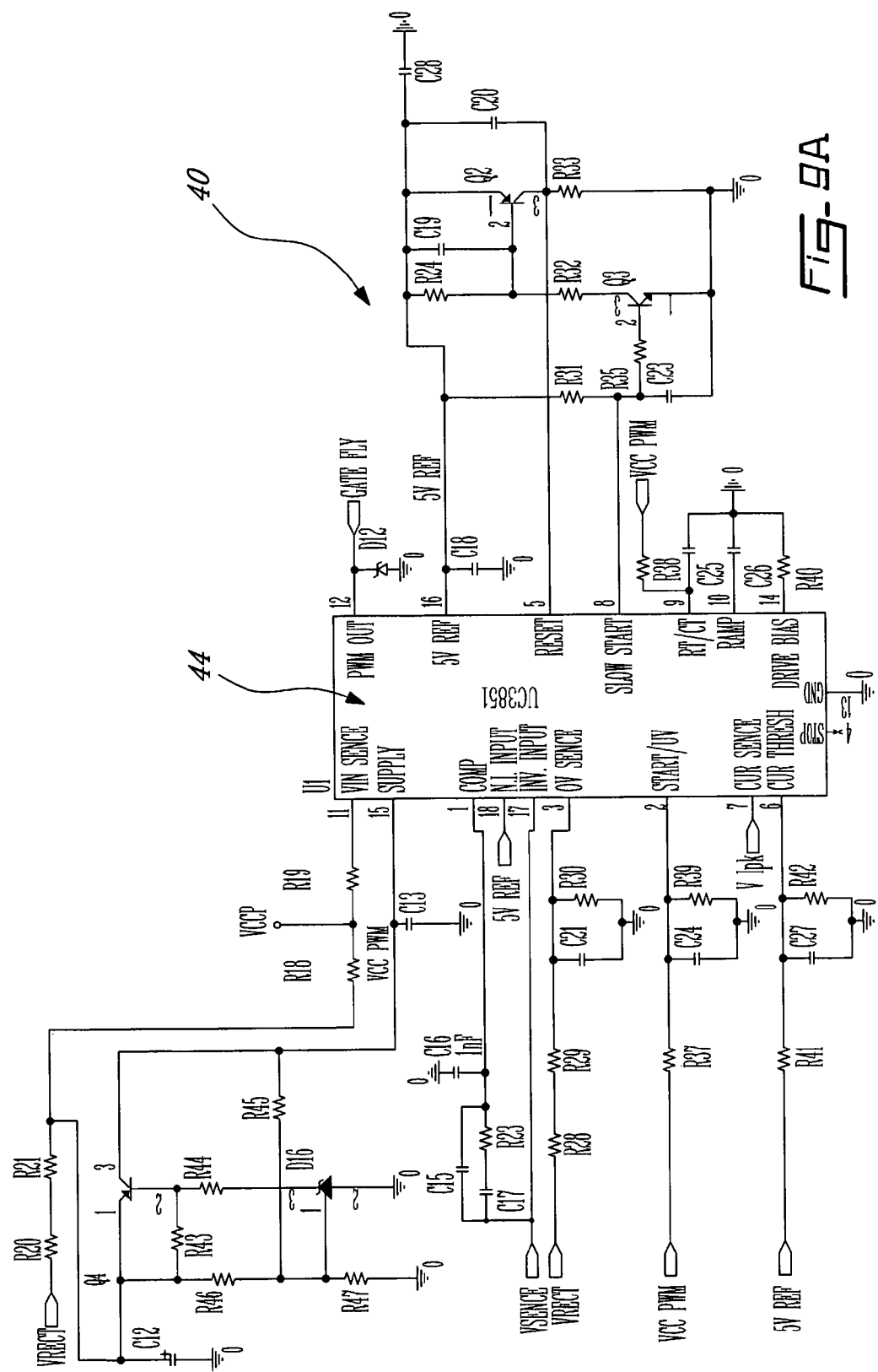
FIGS. 9A-9B are circuit diagrams illustrating a power converter controller part of the system for controlling a matrix of light emitting diodes according to the second illustrative embodiment of the present invention.
Figure 9B:
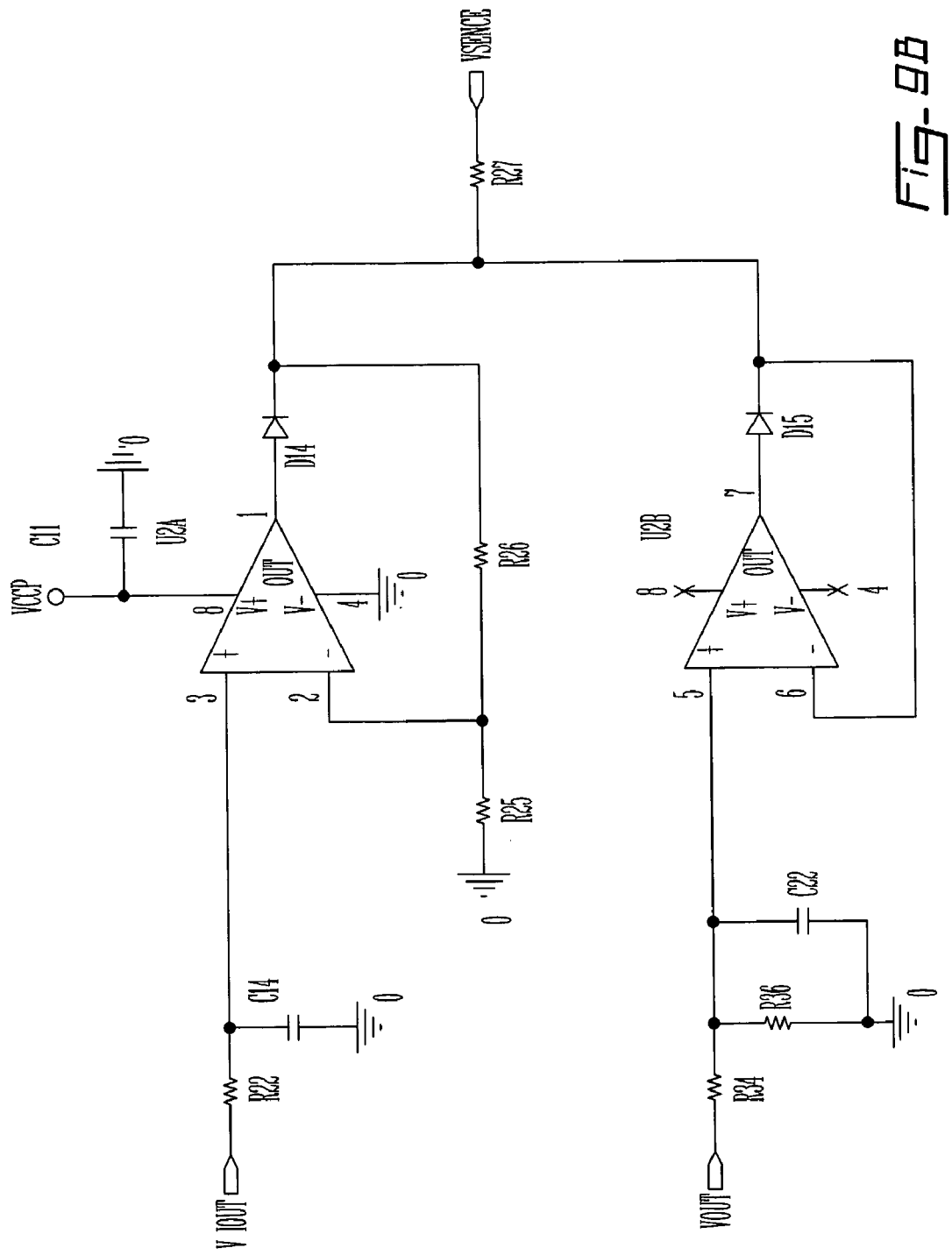

The converter controller 40 will now be described with reference to FIGS. 9A-9B.

The controller 40 is configured so as to yield a unity power factor and a low THD. Considering a maximum duty cycle of 50% and that this duty cycle is fixed for at least half period of the utility frequency (10 or 8.33 milliseconds for 50 Hz or 60 Hz respective frequency), this yields a unity power factor (higher then 0.97 at nominal AC line input voltage, higher then 0.95 for all input voltage range "nominal voltage±15%") and also a low THD, which will be less then 10% at nominal AC line input voltage. To achieve these performances, any fixed frequency pulse width modulator with 50% maximum duty cycle can be used to control the input current wave shape and to regulate the output current. For example, the UCC3851 from Texas Instrument 44 can be used for such purposes.

To ensure high robustness against line disturbances some extra protections are implemented. Then to avoid transformer saturation, the transistor peak current limit is implemented. More specifically, a measurement network is formed in the power converter 38 by R17, R16, C9, and the threshold is set by Vref, R41, R42 and C27. To keep the main transistor 44 in a safe operating area, fast high input voltages detect is implemented via R28, R29, R30 and C21. It is to be noted that the duty cycle can be limited cycle by cycle.

Figure 10A:
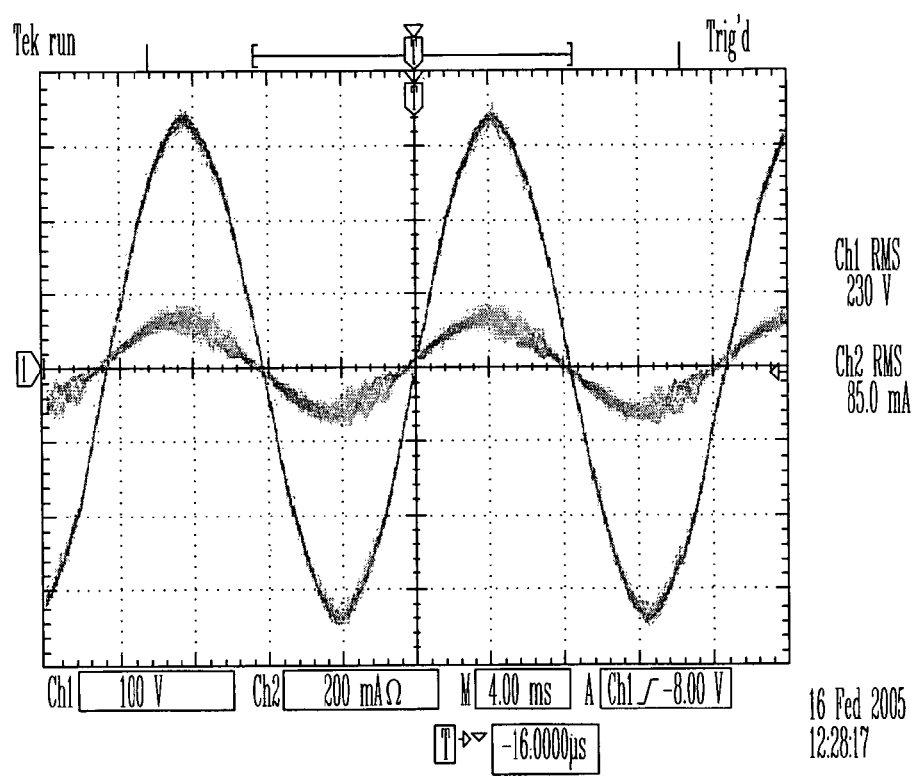
FIGS. 10A, 10B and 10C are graphs illustrating respectively the steady state wave forms at nominal input utility line (input current and voltage), the start up wave forms at low utility line (input voltage and output current) and the flyback main transistor wave forms (voltage and current) of the streetlight according to the second illustrative embodiment of the present invention.
Figure 10B:
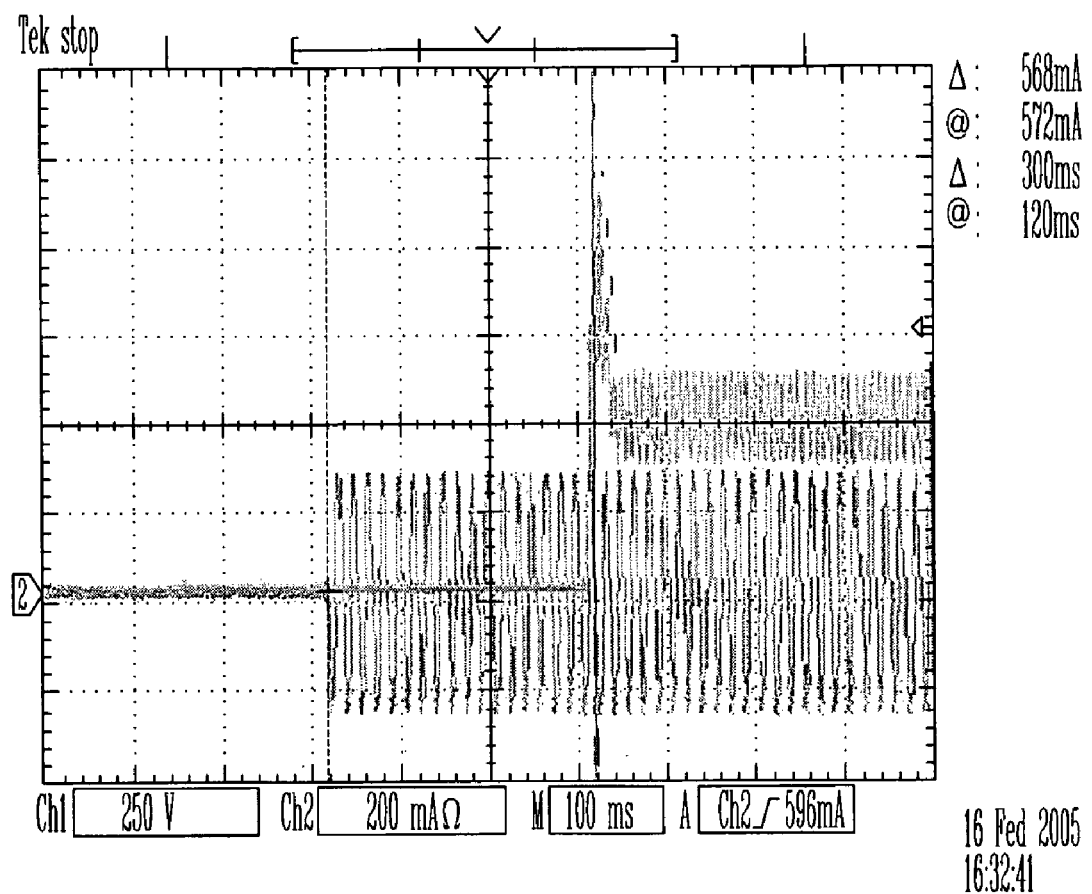
Figure 10C:
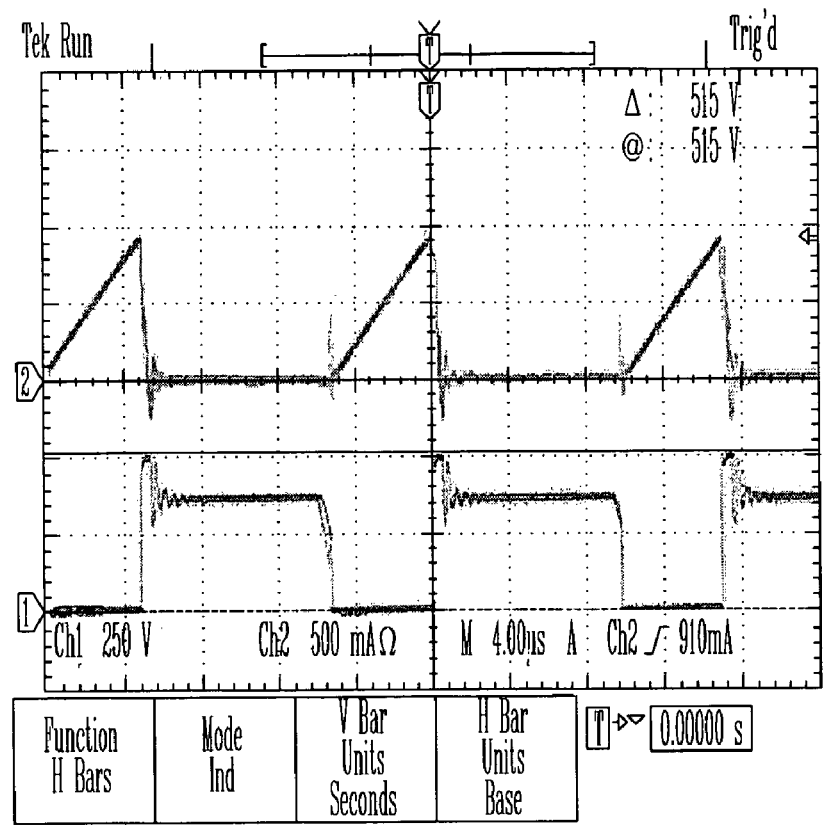

Experimental wave form results obtained using the LEDs matrix controlling system according to the second illustrative embodiment of the present invention are illustrated in FIGS. 10A-10C.

FIGS. 10A, 10B and 10C are graphs illustrating respectively the steady state wave forms at nominal input utility line (input current and voltage), the start up wave forms at low utility line (input voltage and output current) and the flyback main transistor wave forms (voltage and current) of the streetlight according to the second illustrative embodiment of the present invention.

The experimental values have been obtained using a controlling system according to the present invention having components similar to those described with reference to FIGS. 7-9B configured to control a matrix of LED of 16 Watts and having an operating range between 176 Vrms and 300 Vrms.

FIG. 10A shows that the waveforms of the input current (channel 2) and of the input voltage (channel 1) are identical, yielding a unity power factor and allowing to minimize the harmonic distortion.

FIG. 10B shows that a maximum delay of about 0.3 second is required to achieve maximum illumination after applying the input voltage. This is one of the reasons why the system for controlling a matrix of LEDs according to the second illustrative embodiment of the present invention is particularly interesting in signalization applications (including road, railway and ocean signalization).

FIG. 10C shows that the cycle ratio is fixed and inferior to 50% (on at least half a cycle), that the current is discontinuous, and that the voltage at the transistor's terminal is clamped.

Even though the present invention has been described by way of reference to illustrative embodiments wherein the input line has been in the form of an A.C. utility line, it can be connected to any type of input line, including a D.C. line.

Although the present invention has been described hereinabove by way of illustrative embodiments thereof, it can be modified without departing from the spirit and nature of the subject invention, as defined in the appended claims.

What is claimed is:

1. A system for controlling a matrix of light emitting diodes (LED) connected to an input line, the system comprising:
    a power converter for connecting to the matrix of LEDs and to the input line therebetween and for receiving from said input line an input current and an input voltage characterized by a shape and a frequency and for providing a direct current (D.C.) output for powering up the LEDs, yielding an operating current through the LEDs; said power converter including a first current sensor for sensing said input current and a second current sensor for sensing said operating current;
    a controller for connecting to both the input line and to said power converter; said controller including a voltage sensor for sensing said input voltage and a pre-regulator i) for receiving said operating current, said input current and said input voltage, ii) for biasing said operating current towards a target current value, and iii) for regulating said power converter to cause said input current to follow said shape and frequency of said input voltage, yielding a unity power factor and minimizing harmonic distortion of said input current.

2. A system as recited in claim 1, wherein said power converter is in the form of a boost converter.

3. A system as recited in claim 2, wherein said boost converter further includes an input diode bridge, an output diode and an active switch and an inductor therebetween; said active switch being modulated to force said input current to follow said shape and frequency of of said input voltage.

4. A system as recited in claim 2, further comprising a high frequency auxiliary power supply configured so as to yield an output voltage regulated proportionally to said D.C. output for powering up the LEDs.

5. A system as recited in claim 1, wherein said power converter is in the form of a flyback converter.

6. A system as recited in claim 5, wherein said flyback converter further includes an input diode bridge, two output diodes and an active switch and a transformer therebetween; said active switch being modulated to force said input current to follow said input voltage.

7. A system as recited in claim 6, wherein said transformer includes an extra secondary winding; said flyback converter further comprising a diode and a capacitor for defining a high frequency auxiliary power supply with said extra secondary winding for automatically providing an auxiliary output voltage proportional to said D.C. output.

8. A system as recited in claim 1, wherein said first current sensor includes first resistors connected in series.

9. A system as recited in claim 1, wherein said second current sensor includes second resistors connected in parallel.

10. A system as recited in claim 1, wherein said voltage sensor includes third resistors in series connected to said pre-regulator as an input thereof.

11. A system as recited in claim 1, further comprising a temperature sensor coupled to said controller for measuring an operating temperature of said LEDs; said target current value being adjusted according to said operating temperature of said LEDs.

12. A system as recited in claim 1, further comprising an electromagnetic interference (EMI) filter connected to both said input line and said power converter therebetween.

13. A system as recited in claim 1, wherein said power converter is provided with a converter input for connecting to the input line; said converter input including a negative temperature coefficient resistor for controlling said input current during a start-up.

14. A system as recited in claim 1, wherein said pre-regulator is further configured with a voltage regulation mode, whereby an output voltage for powering the LEDs is limited to a predetermined value.

15. A system as recited in claim 1, wherein said input line is a direct current line (D.C.).

16. A system as recited in claim 1, wherein said input line is an alternating current (A.C.) line.

17. A system as recited in claim 1, wherein said matrix of LEDs includes a combination of LED connected in series and in parallel.

18. The used of the system recited in claim 1, for controlling a matrix of LEDs in a light selected from the group consisting of a streetlight, a highway light, a playground light, a monument light, an indoor light, a parking light, a pathway light, a building light, a roadway light, a tunnel light, a signalization light, a residential light, an industrial building light, an office light, flood and area type lighting fixtures and luminaries, and a light aimed at a piece of art or at an ornamental object.

19. A light comprising:
    a matrix of light emitting diodes (LEDs); and
    a system for controlling a matrix of LEDs as recited in claim 1.

20. A light as recited in claim 19, wherein the light is a streetlight.

21. A system for controlling a matrix of light emitting diodes (LED) connected to an input line, the system comprising:
    converter means for connecting to the matrix of LEDs and to the input line therebetween and for receiving from said input line an input current and an input voltage characterized by a shape and a frequency and for providing a direct current (D.C.) output for powering up the LEDs, yielding an operating current through the LEDs;
    first sensing means for sensing said input current;
    second sensing means for sensing said operating current;
    third sensing means for sensing said input voltage; and
    controller means for connecting to both the input line and to said converter means i) for receiving said operating current, said input current and said input voltage, ii) for biasing said operating current towards a target current, and iii) for regulating said converter means to cause said input current to follow said shape and frequency of said input voltage, yielding a unity power factor and minimizing said input current harmonic distortion.

22. A method for controlling a matrix of light emitting diodes (LED) connected to an input line, the method comprising:
    sensing from said input line an input current;
    sensing from said input line an input voltage characterized by a shape and a frequency;
    providing a LED target current operating value;

converting said input line voltage into a direct current (D.C.) output voltage for powering up the LEDs, yielding an operating current through the LEDs, by forcing said input current to follow said shape and frequency of said input voltage, yielding a unity power factor and minimizing harmonic distortion of said input current;

sensing an operating current through said LEDs; and biasing said operating current towards said LED target current operating value.

23. A method as recited in claim 22, further comprising sensing an operating temperature of said LEDs; and adjusting said target current operating value with said operating temperature of said LEDs.

24. A method as recited in claim 22, further comprising adjusting said target current value with time to cope with aging of said matrix of LEDs.

* * * * *